356-400 $$$ SR

12/26/78 XR 4,131,804

United States Patent [19]

Sick et al.

[11] 4,131,804

[45] Dec. 26, 1978

[54] ELECTROOPTICAL SCANNING DEVICE

[75] Inventors: Erwin Sick, Icking; Arthur Walter, Waldkirch; Günter Fetzer, Gundelfingen, all of Germany

[73] Assignee: Erwin Sick Gesellschaft m.b.H. Optik-Elektronik, Waldkirch, Germany

[21] Appl. No.: 807,085

[22] Filed: Jun. 16, 1977

[30] Foreign Application Priority Data

Jul. 5, 1976 [DE] Fed. Rep. of Germany ....... 2630209

[51] Int. Cl.[2] ............ G06K 7/10

[52] U.S. Cl. ............ 250/566; 356/429; 356/400

[58] Field of Search ............ 250/566, 567, 237 R, 250/578; 356/172

[56] References Cited

U.S. PATENT DOCUMENTS

| | | | |
|---|---|---|---|
| 3,453,439 | 7/1969 | Donald et al. | 356/172 |
| 3,867,038 | 2/1975 | Westell | 356/172 |

*Primary Examiner*—M. Tokar

*Attorney, Agent, or Firm*—Townsend and Townsend

[57] ABSTRACT

An electrooptical scanning device which can detect the relative position of register mark applied to a moving web, either serially on a single track or in two parallel, side-by-side tracks which extend in the direction of movement of the web. Light from a light source positioned some distance above the web is split into three light beams and the light beams are reflected downwardly towards the web. Lenses are positioned to receive and direct the light beam at an oblique angle onto the marks on the track or tracks. The lenses are aligned with the tracks and the light beam passing through a given lens is directed to the opposite track to illuminate three positions, two on the first track and one position on the second track. Light impinging on the web at these positions is scattered. Vertically upwardly scattered light is captured by the lens overlying the particular illuminated position and hence directed via suitable optics to photo-detectors which generate output signals that can be used to determine the relative locations of the marks to thereby detect any misalignments of the web.

12 Claims, 5 Drawing Figures

ELECTROOPTICAL SCANNING DEVICE

BACKGROUND OF THE INVENTION

The invention relates to an electrooptical scanning device for the detection of at least two oblong register marks extending at right angles to the direction of movement and arranged side by side or in series on webs moved in the longitudinal direction thereof with an optical scanning head located above the web having an illuminating device and at least two lenses, by means of which the two marks are represented on in each case one photodetector associated therewith, whereby conclusions can be drawn on the association of the register marks from the output signals of the photodetectors.

Electrooptical scanning devices of this type are used in the printing industry for so-called register adjustment which serves, particularly in the case of multicolor printing, to bring about a perfect alignment between the printing rollers and the webs of paper.

An electrooptical scanning device is already known, which permits the scanning of register marks which are both juxtaposed and in series, in that the scanning head containing two incorporated sensors can be rotated by 90°. However, in this known solution, it is necessary to use further lamps with a filament twisted by 90°. This requirement and the relatively complicated rotary mounting of the scanning head lead to a relatively costly scanning device, whereby account must also be taken of additional expenditure in time for changing over. The considerable expenditure for the rotary mounting of the scanning head is necessary in order to satisfy the high precision requirements on such a scanning head.

BRIEF SUMMARY OF THE INVENTION

For reasons of the high precision required when comparing the register marks, the limited spacing between the marks, the place of use (areas where there is an explosion hazard) and the ease of operations, the problem of the invention is to provide an electrooptical scanning device of the type indicated hereinbefore, which can be mechanically securely fixed and immovable, so that even during prolonged operation there is no danger of it becoming misaligned whereby however it is still possible to detect register marks which are both juxtaposed and in series. The invention also aims at providing an explosion-proof, sealable apparatus which can be used in an explosive atmosphere.

According to the invention, this problem is solved in that three lenses and photodetectors associated therewith are positioned in the corners of a right-angled triangle and either the two juxtaposed photodetectors or the two photodetectors in series are active. Preferably, an electrical changeover switch is provided for the selective activation of the juxtaposed and series-arranged photodetectors. As a result of this construction, it is unnecessary to change over the scanning device on passing from one register mark type to another and no movable mounting of the scanning head is necessary, so that the associated expenditure is avoided. Compared with the known arrangement, the operation of the changeover switch takes up virtually no time and also in no way impairs the precision of the spatial position of the scanning device.

Thus, only two of the three photodetectors are activated at any one time.

As the paper used for printing in the unprinted state can have a considerable contrast relative to the color printing of the register marks, e.g., due to wood or fibre inclusions, a particularly advantageous embodiment of the invention provides for the brightness striking each photodetector to be integrated over a maximum large portion in the longitudinal direction of the register mark. This utilizes the fact that the paper structure has no preferred direction, whilst the register marks always extend at an angle of 90° to the direction of movement of the paper. With the integration according to the invention which occurs in the longitudinal direction of the register marks, the contrasts caused by the paper structure are averaged out whilst, as soon as a register mark is detected by the photodetector there is an integration corresponding to the brightness of the register mark.

Integration can take place in simple manner in that on optically representing the oblong marks a shortening is brought about. To this end, a cylindrical lens is arranged in front of the photodetector. Shortening preferably takes place in a ratio of 1:3 to 1:4. However, the width of the register marks is preferably represented in a ratio of 1:1. Thus, the register marks are only contracted in their longitudinal direction and not in their horizontal direction.

According to a further advantageous embodiment, the optical axes of the receiver systems are located perpendicular to the scanned web and a separate illuminating pencil is directed onto the web at an angle relative to the base of each optical axis which clearly differs from the vertical. According to the invention, this angle is made sufficiently large that there is no specular reflection in the reception optics, which could, e.g., occur with register marks having reflecting surfaces. It would be conceivable, for example, that by the reflection of light on a dark register mark more light would reach the receiver than as a result of the diffuse scattering of the light on a bright web. As a result of the measure proposed by the invention, it is ensured that even a reflecting dark register mark is detected by the photodetectors as a dark element. Thus, according to the invention, light transmitters and receivers are arranged in V-shaped manner, whereby the receiver is positioned perpendicularly above the scanning plane, so that the measuring point does not change in the case of modification to the scanning spacing.

Due to the fact that with such scanning spacing changes there is a displacement of the intersection area of the transmitting light beam and the receiving light beam in order to allow such limited scanning spacing changes a further advantageous embodiment of the invention provides that the plane defined by each illuminating beam and the associated optical axis of the receiving system is positioned parallel to the longitudinal direction of the marks. Normally, the intersection area of the two beams is advantageously in the center of each register mark which is preferably in the form of an oblong rectangular field. In the case of scanning spacing changes, the intersection area then merely moves in one or other direction along the longitudinal path of the register marks, so that within a specific scanning spacing fluctuation range, the register marks can still be reliably detected.

In principle, in order to obtain each V-shaped light barrier, two lenses would be necessary, namely one for the illuminating beam path and the other for the receiving beam path. However, according to a preferred embodiment of the invention, at least one lens is utilized twice for representing a mark on the associated photodetector and for illuminating an adjacent mark. Thus, at least one lens can be saved.

In the arrangement according to the invention, with three photodetectors, the construction is advantageously such that four lenses are arranged in one plane, whereof two are simultaneously located in the reception beam path of the photodetector associated therewith and in the illuminating beam path of an adjacent photodetector. Thus, it is only necessary to have four lenses for three V-shaped light barriers.

A particularly good utilization of space is obtained if the four lenses are arranged on a square in the closest possible packing. The lens provided for illumination purposes is thereby penetrated at an angle, so that perpendicularly below the adjacent lens intersection takes place with the reception beam path.

Preferably, only one lamp, advantageously a halogen lamp is used for illumination purposes. The lamp can be positioned in the upper part and in the centre of three light deflection devices, each of which laterally passes a light beam downwards to the receiver plane. Plane mirrors direct the light beams into one of the lenses in each case.

Filters can be positioned between the photodetector and the associated lens for spectral adaptation of the lamp, color marks and spectral sensitivity of the photodetector, as well as for the optimum alignment of the latter.

To limit the field of view of the photodetector, a stop is advantageously arranged directly in front of each photodetector. As a result, the mark length or width detected by the photodetector can be adjusted to a desired value.

With reference to the beam path, the lamp filament preferably extends in the same direction as the associated mark. In other words, the filament which is substantially rectangular in plan view is adapted to the rectangular shape of the register marks. To obtain a complete illumination of the register marks in the scanning plane, the lamp filament is represented in the associated lens and the condenser lens on the web plane.

BRIEF DESCRIPTION OF THE DRAWINGS

Other and further objects of the present invention will be apparent from the following description and claims and are illustrated in the accompanying drawings, wherein show:

DETAILED DESCRIPTION OF THE PREFERRED EMBODIMENTS

Figure 1:
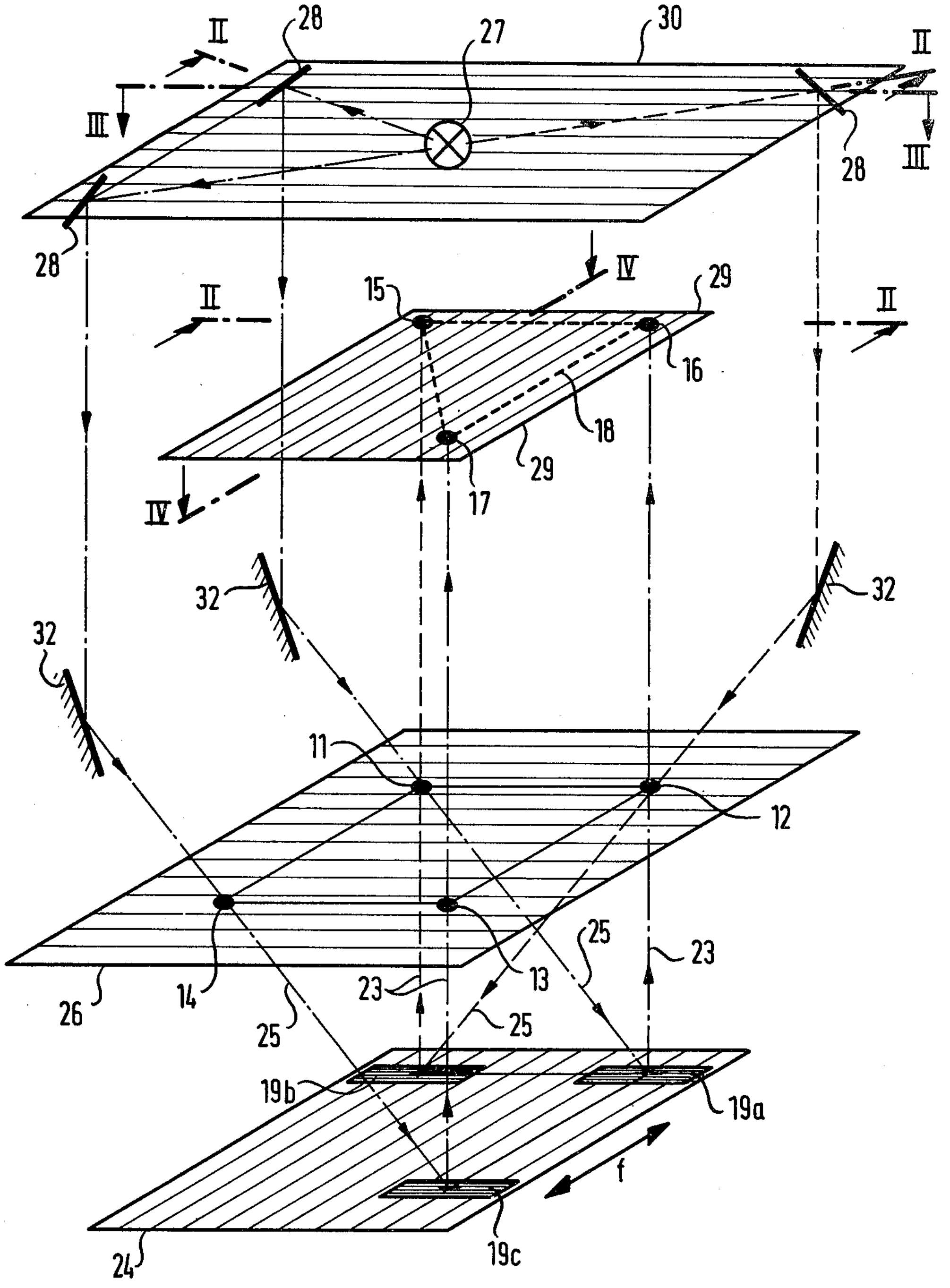
FIG. 1 a purely diagrammatic perspective view of an optical scanning head according to the invention, whereby the individual optical and electronic elements are only indicated by dots or dashes in order to represent the beam path as clearly as possible.
Figure 2:
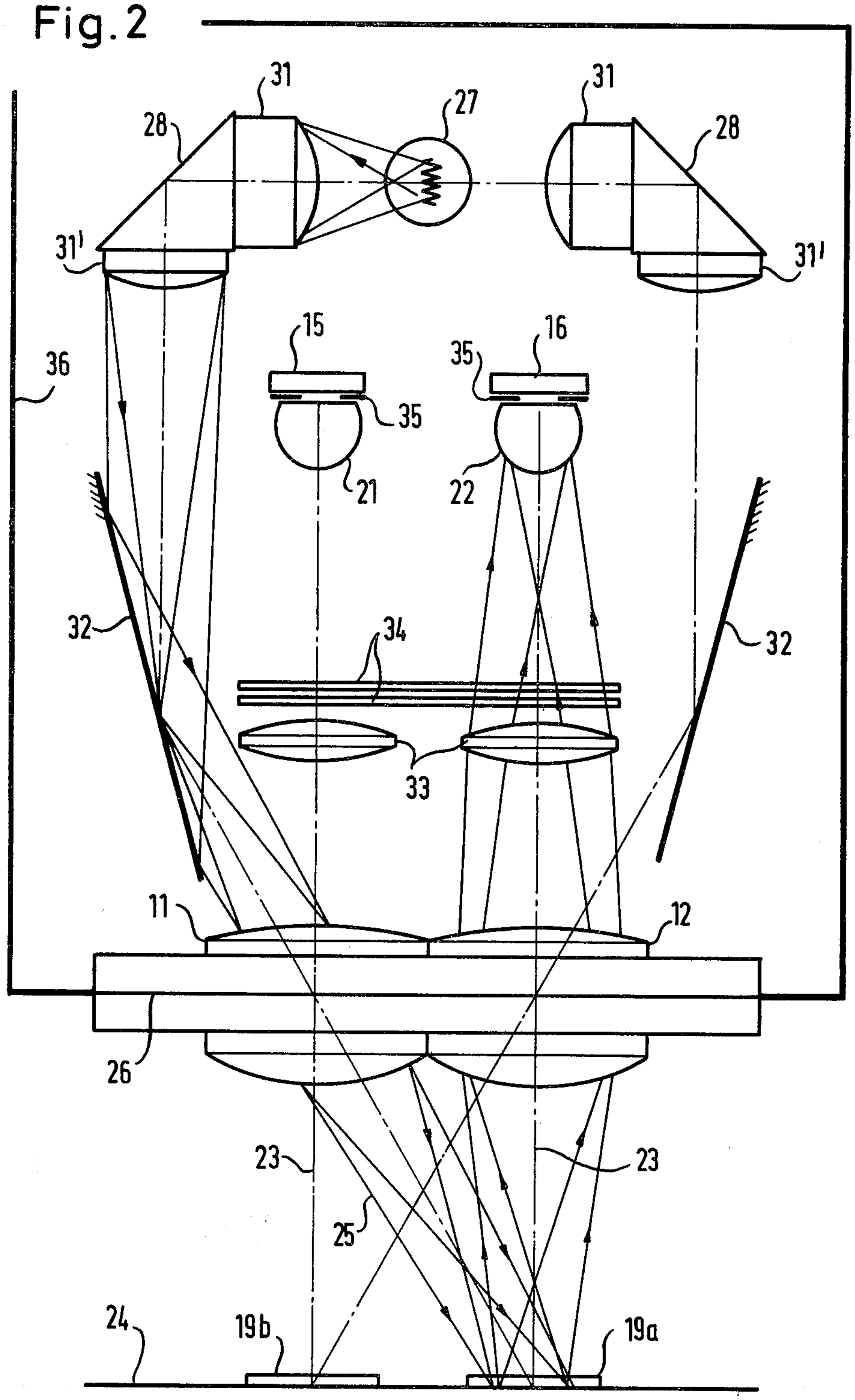
FIG. 2 a section along the lines II—II in FIG. 1, the section being taken above the receiver plane 29 towards the two rearwardly directed light beam and above the receiver plane 29 according to the lower section line II—II of FIG. 1.

According to FIGS. 1 and 2, the optical scanning head according to the invention arranged in a casing 36 has in superimposed manner a lamp plane 30, a small receiver plane 29 and a lens plane 26 positioned at the bottom.

Figure 3:
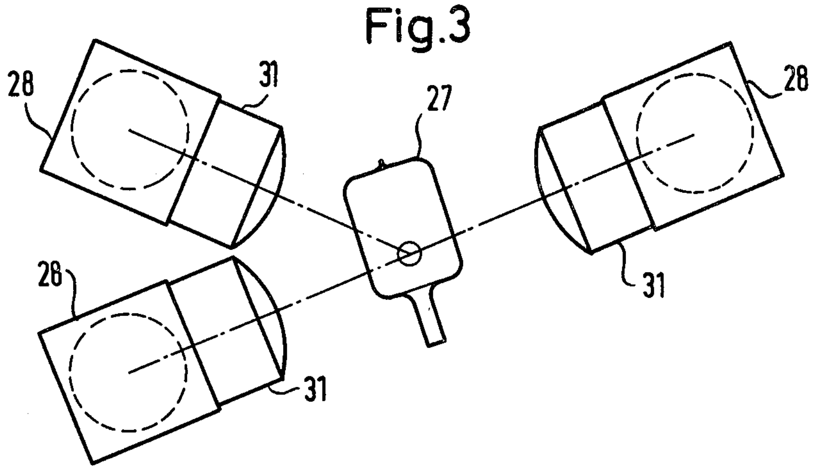
FIG. 3 a plan view of the lamp plane along the line III—III of FIG 1.

According to FIGS. 1 to 3, a lamp 27 with a vertical filament is positioned centrally in the lamp plane. The light emanating from lamp 27 strikes three all-round condensers 31 whereby the precise angular association which is essential for the invention can be gathered from FIG. 3. Two condensers 31 diametrically face one another, whilst the third condenser is at an acute angle to one condenser and at an obtuse angle to the other condenser. The three condensers 31 are at the same spacing from the filament of lamp 27.

Directly following and forming one component with the condensers, three deviating prisms 28 are provided, which deflect downwards by 90° the incident light (FIGS. 1 and 2). The condenser can also be divided up into two parts 31, 31′, one part being located in front of and the other behind the deviating prisms.

Four lenses are fixed in a square arrangement in lens plane 26. All four lenses are positioned further inwards than the light deflecting devices, so that the light beam coming from the deviating prisms 28 can be deflected in an inclined manner into the associated lens (11 in FIG. 2, or 11, 12 in FIG. 1) by the plane mirror 32 provided according to FIG. 2 that it meets the plane of the web 24 to be scanned pervertically below the adjacent lens (12 in FIG. 2 or 12, 11 in FIG. 1). The register marks *19a, 19b, 19c* to be scanned are in each case arranged perpendicularly below one of the lenses 11, 12 or 13.

The fourth lens 14 deflects the third light beam into the web plane 24 below lens 13, so that lenses 14, 13 serve solely for the illumination or the reception, respectively, while the lenses 11 and 12 have a double function, in that they simultaneously serve to illuminate the scanning area of the adjacent lens and for receiving light from the register mark located below them.

By means of the three lenses 11, 12, 13 the register marks are represented on the light-sensitive surfaces of photodetectors 15, 16, 17 in the manner shown in FIG. 2. For representation purposes, reception condensers and cylindrical lenses 21 are provided in addition to lenses 11, 12, 13. Condensers 33 permit a representation of the register marks below the transmitting condensers 31, which considerably contributes to the compactness of the apparatus. The complete arrangement according to the invention also has the object of housing a very effective optical scanning device in the smallest possible area.

Between reception condensers, it is also possible to provide color filters 34, which unlike the remaining optical elements can be common to all three reception beam paths. A cylindrical lens, not shown in the drawing, is positioned in front of the third photodetector 17. In addition, a reception condenser 33 and filter 34 are associated with said photodetector.

Figure 4:
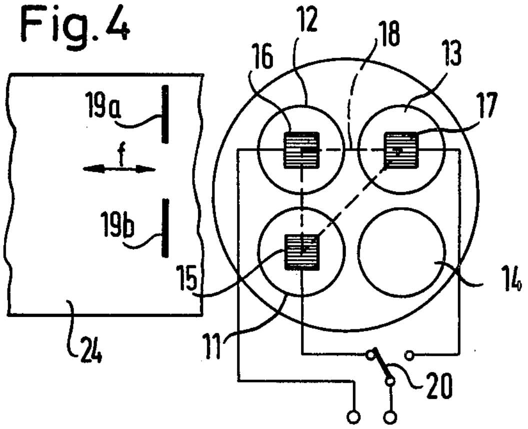
FIG. 4 a diagrammatic view along the line IV—IV in FIG. 1, i.e., a plan view on the receiver plane and the underlying lens plane, whereby part of the paper web is also shown, the electrical switchover possibility for the three photodetectors being indicated.
Figure 5:
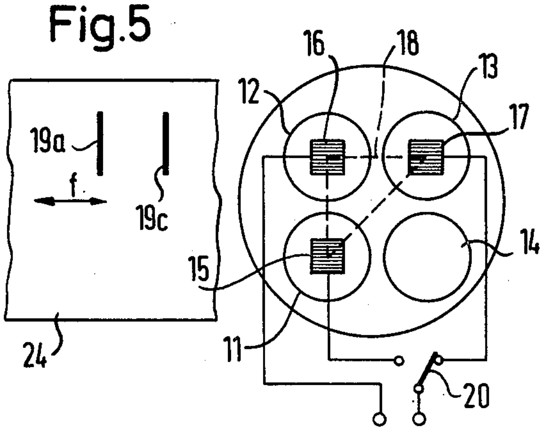
FIG. 5 an identical view of FIG. 4, whereby however in place of two juxtaposed register marks two register marks are indicated in series on the web of paper.

The function of cylindrical lenses 21, 22 is to shorten the representation of register mark 19 in such a way that there is a full illumination on the photodetectors, for example the square areas shown in FIGS. 4 and 5.

A field stop 35 is arranged directly in front of photodetectors 15, 16, 17 and as a result light only acts on the desired areas of the photodetectors.

As can be gathered from FIGS. 1 and 2, it is vital for the invention that the optical axis 23 of the reception beam paths is perpendicular to the plane of web 24, while the illumination beams 25 emanate at an angle from the adjacent lens in such a way that they intersect the optical axis 23 as closely as possible to the centre of register marks 19.

FIGS. 4 and 5 show particularly clearly the arrangement according to the invention of reception lenses 11, 12 and 13 and the associated photodetectors 15, 16, 17 at the corners of a right angle triangle 18. For reasons of clarity, this right angle triangle 18 is also shown in FIG. 1.

FIG. 4 also shows a changeover switch 20, which can be connected in the represented manner to the three photodetectors 15, 16, 17. In the position of changeover switch 20 shown in FIG. 4, only photodetectors 15, 16 are active in order to detect the two juxtaposed register marks 19*a*, 19*b*. Changeover switch 20 assumes the position shown in FIG. 5 when the two photodetectors 16, 17 are to be active in order to detect the register marks 19*a*, 19*c* which are arranged in series.

The direction of movement of the web of paper 24 is designated by f in all the embodiments. In other words, register marks 19 extend perpendicular to the movement direction f of web 24.

Electrooptical scanning device according to the invention functions in the following manner:

Firstly, depending on whether juxtaposed register marks or register marks located in series are used, changeover switch 20 is brought into the position of FIG. 5 or FIG. 4. The device is now ready for operation and the web of paper can be moved in one of the directions of double arrow f. On passing through the register marks, the now active photodetectors 16, 17 or 15, 16 supply marks, the now active photodetectors 16, supply signals which are characteristic of their association and which are evaluated in a suitable evaluation electronic system.

The invention is not limited to the embodiments described and represented hereinbefore and various modifications can be made thereto without passing beyond the scope of the invention.

What is claimed is:

1. An electrooptical scanning device for detecting the relative locations of register marks arranged on a moving web one behind the other along a first track only, the first track extending in the direction of movement of the web, and also of register marks arranged in side-by-side, neighboring first and second, tracks extending in the direction of web movement, the electrooptical scanning device comprising: a light source; optical illuminating means for directing light from the light source at an oblique angle with respect to the web onto at least three positions along the first and second tracks for illuminating such positions; a photo-electric detector for each of said positions arranged for receiving light from the source and scattered generally perpendicularly from the associated illuminated positions, the detectors generating output signals which are responsive to the scattered light received by them; whereby the passage of a register mark past one of the positions and its relative location with respect thereto can be detected by analyzing the output signals.

2. An electrooptical scanning device according to claim 1 including a changeover switch having first and second positions, and circuit means operatively coupled with the switch and the detectors for alternatively isolating one of the detectors to restrict detection of the register marks to marks arranged one behind the other along the first track and to marks arranged on the first and second tracks.

3. An electrooptical scanning device according to claim 1 wherein the otical illuminating means includes first and second pairs of lenses, the first pair being disposed vertically above the first track and the second pair being disposed vertically above the second track, the lenses of each pair being arranged one behind the other in said movement direction; means for obliquely directing light from the source through one of the lenses of the first pair of lenses for illuminating a position on the second track located beneath a lens of the second pair; and means for obliquely directing light through the second pair of lenses for illuminating positions on the first track located beneath the lenses of the first pair; and wherein the respective photoelectric detectors are disposed above the first pair of lenses and the lens above the illuminated position on the second track.

4. An electrooptical scanning device according to claim 3 including condenser lenses associated with the photoelectric detectors and disposed between the detectors and the respective lenses of the first and second pairs.

5. An electrooptical scanning device according to claim 4 wherein which the light source comprises a single lamp disposed above the photoelectric detectors, and wherein the optical illuminating means includes a light receiving device for each of the illuminated positions and adapted to receive light from the lamp and to deflect the light downwardly, and an obliquely positioned mirror for each light receiving device forming said means for obliquely directing light through the lenses of the first and second pairs, the mirrors being positioned to receive the light from the light receiving devices.

6. An electrooptical scanning device according to claim 5 wherein the lamp comprises a halogen lamp.

7. An electrooptical scanning device according to claim 5 wherein the lamp includes a filament which is vertically aligned relative to the position of the photoelectric detectors, and wherein the optical illuminating means is operative to project the image of the filament to lie in the plane of the tracks.

8. An electrooptical scanning device according to claim 1 including a cylindrical lens disposed in front of each photoelectric detector, the cylindrical lenses having axes aligned parallel with the direction of the tracks for producing at each of the photoelectric detectors a transversely contracted image of a register mark.

9. An electrooptical scanning device according to claim 8 wherein the cylindrical lenses are constructed to effect a transverse contraction of the images in the range of from 1:3 to 1:4.

10. An electrooptical scanning device according to claim 1 including a color filter positioned in front of the photoelectric detectors.

11. An electrooptical scanning device according to claim 1 including an aperture stop positioned in front of each photo-detector.

12. An electrooptical scanning device according to claim 3 wherein the lenses of the first and second lens pairs are positioned to define the cornors of a square.

* * * * *